(12) United States Patent
Atchison

(10) Patent No.: US 8,277,225 B2
(45) Date of Patent: Oct. 2, 2012

(54) KIT FOR TEACHING THE COMPOSITION OF BLOOD

(76) Inventor: Lakshmi Atchison, Glenside, PA (US)

(*) Notice: Subject to any disclaimer, the term of this patent is extended or adjusted under 35 U.S.C. 154(b) by 1183 days.

(21) Appl. No.: 12/116,611

(22) Filed: May 7, 2008

(65) Prior Publication Data

US 2008/0318194 A1 Dec. 25, 2008

Related U.S. Application Data

(60) Provisional application No. 60/945,222, filed on Jun. 20, 2007.

(51) Int. Cl.
*G09B 23/28* (2006.01)

(52) U.S. Cl. ....................................... 434/267

(58) Field of Classification Search .................. 434/262, 434/267, 268, 272, 295
See application file for complete search history.

(56) References Cited

U.S. PATENT DOCUMENTS

| | | | | |
|---|---|---|---|---|
| 2,302,934 | A | * 11/1942 | Barol | 434/295 |
| 4,496,324 | A | 1/1985 | Schulz | |
| 5,055,259 | A | * 10/1991 | Inoue et al. | 422/430 |
| 5,158,461 | A | * 10/1992 | Sulway | 434/268 |
| 5,246,374 | A | 9/1993 | Boodram | |
| 6,007,343 | A | 12/1999 | O'Brien | |
| 6,280,199 | B1 | 8/2001 | Baker | |
| 7,255,565 | B2 * | 8/2007 | Keegan | 434/272 |
| 7,305,331 | B2 | 12/2007 | Allen et al. | |
| 7,651,333 | B2 * | 1/2010 | Tamarkin | 434/295 |
| 7,670,143 | B2 * | 3/2010 | Isaacs | 434/262 |

OTHER PUBLICATIONS

"Baggie Cell Model: Teachers Manual", 2004 [retrieved online Mar. 15, 2012].*
"My Blood Your Blood: Middle & High School Teacher's Guide", 2004 [retrieved online Mar. 15, 2012].*

* cited by examiner

*Primary Examiner* — Kurt Fernstrom
(74) *Attorney, Agent, or Firm* — Paul & Paul

(57) ABSTRACT

A kit for fabricating various visual models is used to teach students about blood, blood pathology, and the quantitative concepts associated with blood pathology. The kit includes various sized containers that hold colored beads that resemble red blood cells and the various types of white blood cells.

23 Claims, 4 Drawing Sheets

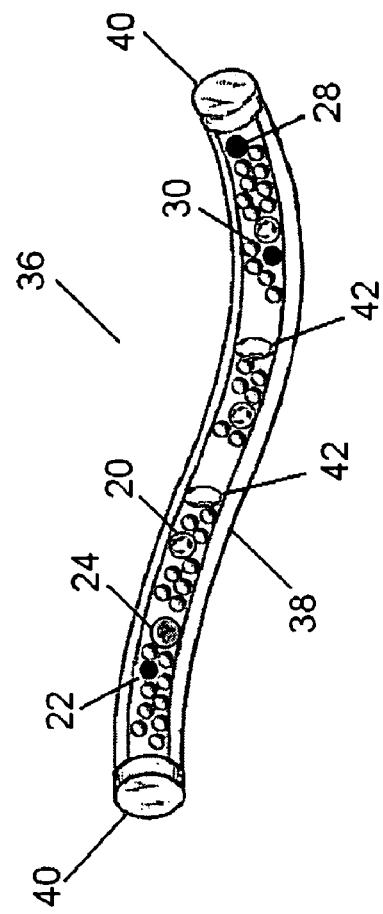
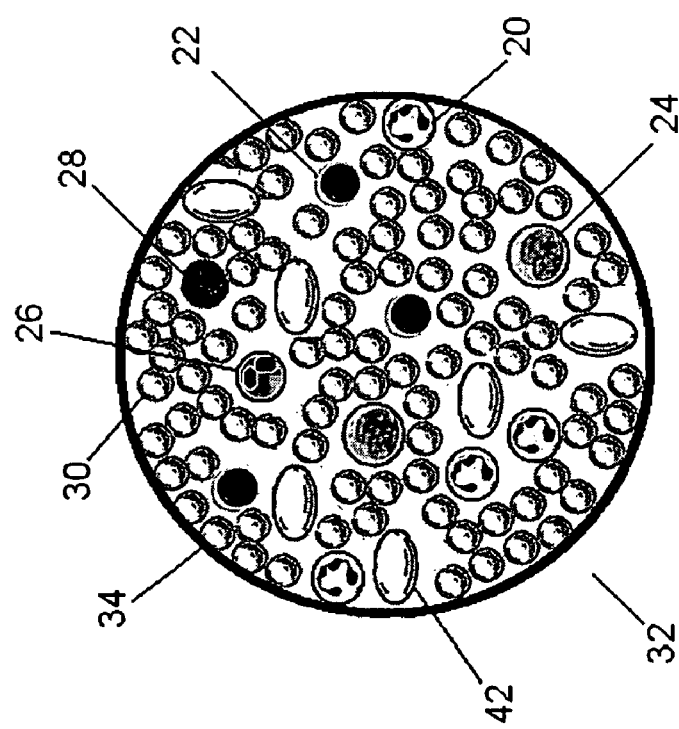

KIT FOR TEACHING THE COMPOSITION OF BLOOD

CROSS REFERENCE TO RELATED APPLICATION

This application claims the benefit of the U.S. Provisional Patent Application No. 60/945,222 filed on Jun. 20, 2007.

BACKGROUND OF THE INVENTION

1. Field of the Invention

The present invention relates to teaching aids; and in particular to visual aids for teaching scientific biological concepts.

2. Brief Description of the Prior Art

The processes of hemopoiesis, hematocrit analyses, and identification of blood cells for white blood cell differentiation are difficult concepts for students to understand without an advanced education in biology or physiology. The ability to visually identify the presence of white blood cells in a cubic millimeter of blood and classify the white blood cells based on their appearance and population when scattered among staggering numbers (~5 million) of very minute transparent red blood cells requires an understanding of quantitative statistics.

White blood cells defend the body against both infectious disease and foreign materials and the number of white blood cells in a sample of blood can change if a person is afflicted with a particular blood disorder. White blood cells only make up approximately 1% of blood in a healthy adult and the total number of white blood cells is further divided into several categories. The types of white blood cells include neutrophils (60-70%), eosinophils (2-4%), basophils (0.5-1%), lymphocytes (20-25%), and monocytes (3-8%). Because white blood cells are greatly outnumbered by red blood cells, it is difficult for a student, for example, to examine a blood smear under a microscope to identify a white blood cell, and even more difficult for the student to identify the type of white blood cell. If the sample is taken from a person afflicted with a blood disorder, determination of the blood disorder is impossible without first determining the type and number of blood cells present in the sample.

There is a need, therefore, for a teaching aid to assist students in understanding blood cell pathology and the quantitative concepts related to this subject.

SUMMARY OF THE INVENTION

The present invention provides a kit for producing a blood cell visual model that can be used to teach students scientific concepts, including, for example, the types of blood cells, quantitative concepts relating to the blood, and blood cell pathology. The kit includes two sets of beads, the first resembling red blood cells and second set resembling white cells. Preferably, the beads resemble, in one or more aspects, the respective blood cells that they are intended to signify. Preferably, the beads resembling white blood cells include beads resembling one or more specific types of white blood cells, including neutrophils, monocytes, lymphocytes, eosinophils, and basophils. The kit optionally includes coarse, granular material that resembles platelets. The kit also optionally includes various sized containers for the beads. The containers preferably have a transparent area such as a transparent side through which the contents in the containers can be viewed to provide a macroscopic model of a blood smear viewed under a microscope, a model blood vessel, or a model of centrifuged blood cell sample from which packed cell volume is determined. The physical characteristics of the beads, such as the proportion, shape, and color of the beads, can be selected to permit a group of beads to represent normal blood or blood afflicted with a specific disorder. The beads and containers may be made of any suitable material such as plastic or glass.

The term "bead" is defined as any body that resembles the shape of a blood cell, including, but not limited to, a sphere, spheroid, ellipsoid, torus, and disk.

In one aspect, the present invention provides a blood cell visual model that makes it easier for students to analyze and readily identify the various white blood cell types based on their size, shape, color, and number.

In another aspect, the present invention provides a blood cell visual model that enables a student to better understand the significance of high and low blood cell counts during infections, allergic reactions, and other pathological conditions.

In a further aspect, the present invention can be used to improve the ability of a student to obtain information from a blood sample when viewed under a microscope.

In another aspect the present invention provides a blood cell visual model that can make it easier for students to understand differential counts of blood cells under a variety of pathological conditions.

In yet another aspect, the present invention can be used to enable students to better understand the physiology of blood circulation and the effects of a blood disorder on circulation.

BRIEF DESCRIPTION OF THE DRAWINGS

The following drawings form part of the present specification and are intended to further demonstrate certain aspects of the present invention. The invention may be better understood by referring to the drawings while reviewing the specific embodiments described in the detailed description below.

FIG. 3 is a plan view of third embodiment of the kit of the present invention shown simulating the visual appearance of human blood afflicted with sickle cell anemia under a microscope.

FIG. 4 is a side elevational view of the fourth embodiment of the kit of the present invention shown simulating human blood afflicted with sickle cell anemia in a blood vessel.

DETAILED DESCRIPTION

Figure 2:
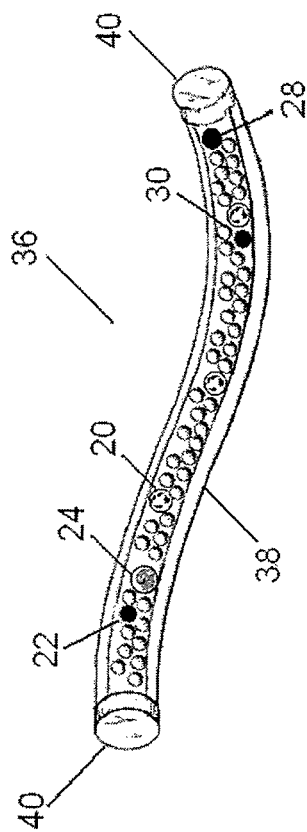
FIG. 2 is a side elevational view of a second embodiment of the kit of the present invention shown simulating normal human blood flow through a vessel.

The present invention provides a kit for producing a blood cell visual model. The blood cell visual model provides a macroscopic view of the various blood cells that would only be possible by viewing a sample of blood under extreme magnification. By providing a macroscopic view of blood, an instructor can easily present and demonstrate the distinguishing characteristics of the cells simultaneously to multiple students, as well as their typical population size. The macroscopic view of the blood provides a tool to enable a student to recognize and comprehend the relative number of red and white blood cells that are expected within a sample of normal human blood and how the population and appearance of blood cells change due to particular blood pathology.

The kit includes at least two sets of beads and a container. The first set of beads represents red blood cells. The second set of beads represents white blood cells. Preferably, the beads resemble, in one or more aspects, the respective blood cells that they are intended to signify; therefore, the first set and second sets of beads are preferably round with the first set being transparent and a light red color while the second set is preferably white, such that the beads can be colored to resemble nucleated white blood cells by staining them deep purple to blue. The shade of deep purple to blue varies depending on the type of white blood cell that the bead represents. For example a bead representing a basophil or lymphocyte would be stained a darker color than a neutrophil or eosinophil. Also, the shape of the stain on the surface of the second set of beads preferably resembles the nucleus of a white blood cell. For example, a bead representing a neutrophil would have a multi-lobed nucleus painted on its surface, an eosinophil would have a bi-lobed nucleus, and a monocyte would have a U-shaped nucleus. The beads and containers may be made of any suitable material such as plastic or glass. The kit optionally includes coarse, granular material that when mixed with the first and second set of beads resembles platelets.

The diameter of the second set of beads is slightly larger than the first set. Preferably, the diameter of the first and second set of beads is proportional to the red and white blood cells that they represent. The average diameter of a human red blood cell is 6-8 microns and white blood cells have an average diameter of 7-14 microns depending on the type of white blood cell. Preferably, the number of beads present in the mixture of the first and second set is also dependent on the type of blood cell that the bead represents and proportional to the average number of red and white blood cells present in human blood.

The kit also optionally includes various sized containers filled with a mixture of the beads. The containers preferably have a side through which the contents can be viewed. The side can either be open or transparent. For example, the kit can include a large circular Petri dish. The top surface of the Petri dish can be open or covered with a transparent lid, so that when viewed from above the macroscopic model resembles the circular field of view of a microscope and the beads resemble a blood smear. The kit can also include a long, flexible cylindrical tube having transparent walls filled with the first and second set of beads to provide a model of a blood vessel to demonstrate blood circulation and the impact of blood pathology on circulation. Another container optionally included in the kit is a test tube having transparent walls, such that the tube can be filled with the first and second set of beads to produce a model of centrifuged blood from which packed cell volume can be determined. The containers, like the beads, can be made of any suitable material such as plastic or glass.

Figure 1:
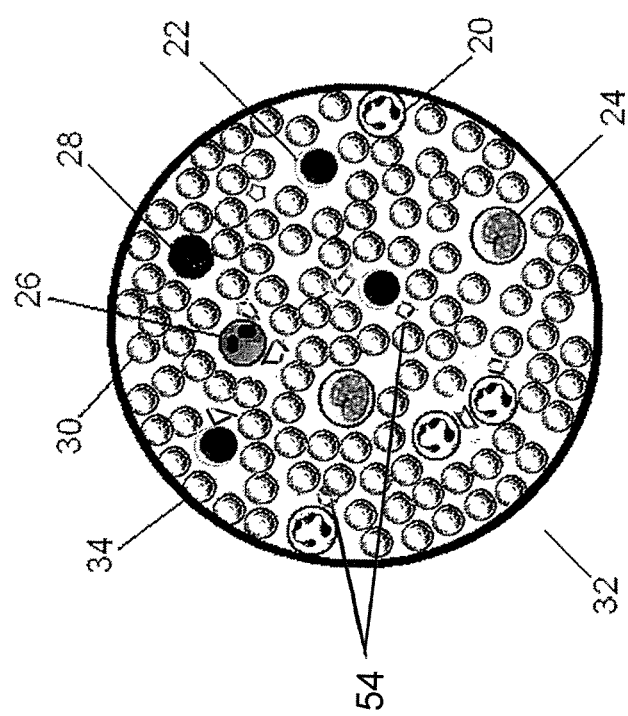
FIG. 1 is a plan view of a first embodiment of the kit of the present invention shown simulating the visual appearance of normal human blood under a microscope.

Referring now to the drawings, in which like reference numerals refer to like elements in each of the several views, there is shown in FIG. 1 a first embodiment of the invention which provides a visual macroscopic model 32 of blood, wherein a container 34, preferably a large, transparent, and circular Petri dish, is filled with red blood cell replicas 30 to simulate the millions of red blood cells typically seen when viewing a blood smear under a microscope. Also mixed with the red blood cell replicas 30 in the container 34 are various replicas of white blood cells, including a neutrophil replica 20, a lymphocyte replica 22, a monocyte replica 24, an eosinophil replica 26, and a basophil replica 28. Optionally, the mixture of white and red blood cell replicas can include small pieces of coarse material that represent platelets 54. The coarse material 54 which is mixed with the beads is preferably made of crushed sea shells due to their resemblance to cell fragments.

Referring now to FIG. 2, which is a second embodiment of the present invention, the mixture of beads and crushed sea shells that was used to fill the container 34 in FIG. 1 is transferred to a long, flexible transparent tube 38. The tube preferably has at least one open end having a removable stopper 40, such that when removed, the contents can flow out of the open end. The diameter of the tube 38 is sufficiently large, so that the mixture of red and white blood cell replicas and coarse material can flow within the walls of the tube 38.

In order to demonstrate the effects of various pathologies on blood, the mixture of red and white blood cell replicas is manipulated by changing the shape or number of the beads. For example, in FIGS. 3 and 4, the mixture of beads that was in the first and second embodiments of the present invention shown in FIGS. 1 and 2, respectively, has been changed by removing some of the red blood cell replicas 30 with elongated, oval shaped beads 42 that are red in color to resemble blood afflicted with sickle cell anemia. The size of the sickle cell replicas 42 is selected, such that the length of the oval shaped beads is longer than the diameter of the transparent tube 38 in FIG. 4. Because the sickle cell replicas 42 are larger than the normal red blood cell replicas 30, the sickle cell replicas 42 may become wedged between the inner walls of the tubing 38 impeding the flow of beads. This provides a better understanding of the effect of sickle cell anemia on circulation. Various other obstructions can be incorporated into the flexible tubing in order to demonstrate the effects of conditions, such as tumors, on blood circulation.

Figures 6A, 6B:
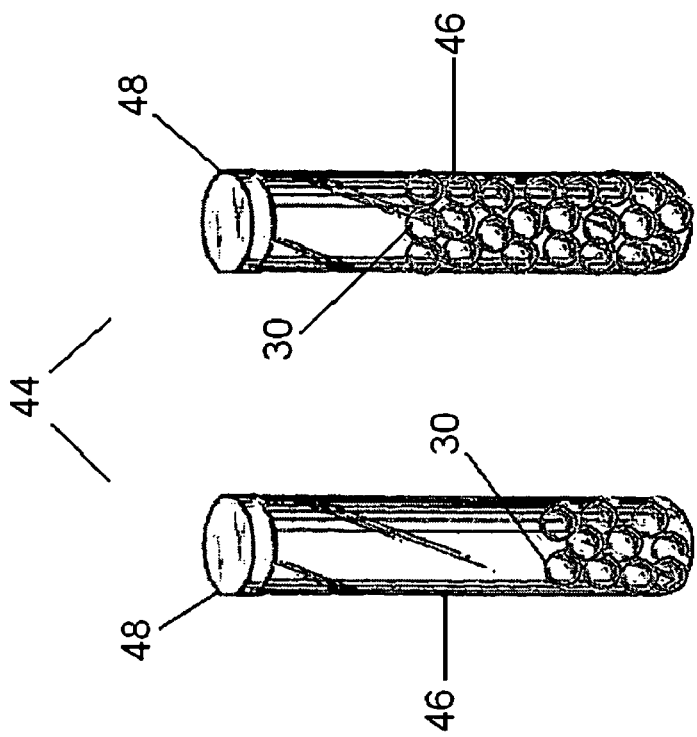
FIG. 6a is a perspective view of a sixth embodiment of the kit of the present invention shown simulating a centrifuged normal blood cell sample from which packed cell volume is determined.
FIG. 6b is a perspective view of a seventh embodiment of the kit of the present invention shown simulating a centrifuged blood cell sample from which packed cell volume is determined, the sample having an abnormally high packed cell volume.
Figure 5:
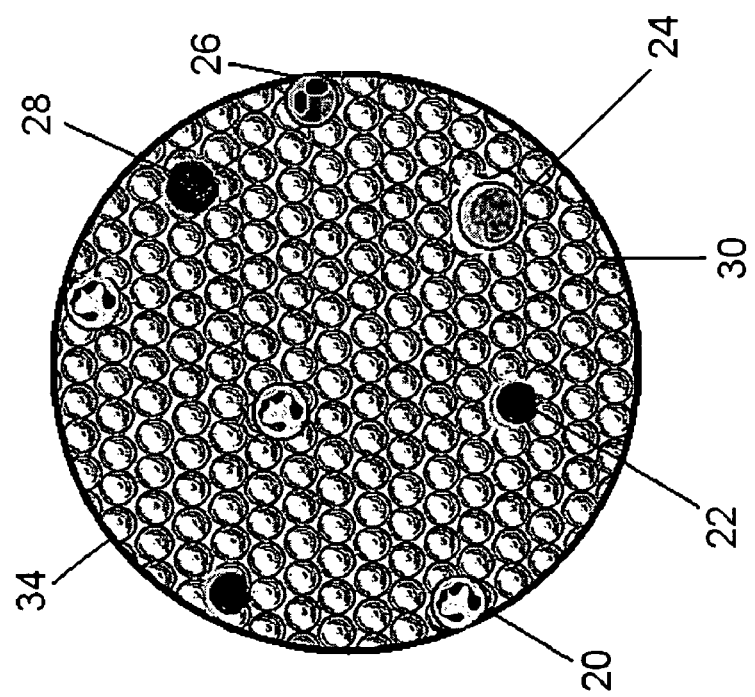
FIG. 5 is a plan view of a fifth embodiment of the kit of the present invention shown simulating the visual appearance of human blood afflicted with polycythemia under a microscope.

Referring to FIG. 5, the proportion of red blood cells and white blood cells has been changed by increasing the number of red blood cell replicas 30 in the transparent container 34. The increased number of red blood cell replicas 30 resembles the excessive accumulation of red blood cells typical of a person afflicted with polycythemia. The excessive accumulation of red blood cells is also demonstrated using a sixth and seventh embodiment of the present invention shown in FIGS. 6*a* and 6*b*, respectively. The sixth embodiment of the present invention provides a visual model 44 to determine packed cell volume (PCV) which is the proportion of blood volume that is occupied by red blood cells. It is normally about 46% for men and 38% for women. A PCV is obtained by placing a sample of blood in a tube and separating the red blood cells from the rest of the fluid with a centrifuge. The resulting layers are then measured to calculate the PCV. In FIG. 6a a container 46, preferably a test tube that optionally has a removable lid 48, is filled with red blood cell replicas 30 to a level which is normal for human blood. For a person afflicted by polycythemia, the level of red blood cells in a PCV would be elevated which is reproduced in the model 44 shown in FIG. 6b. The models demonstrated in FIGS. 5, 6a, and 6b allow a student to comprehend the quantitative aspects of blood pathology by identifying the presence of red blood cells which are statistically excessive.

Figure 8:
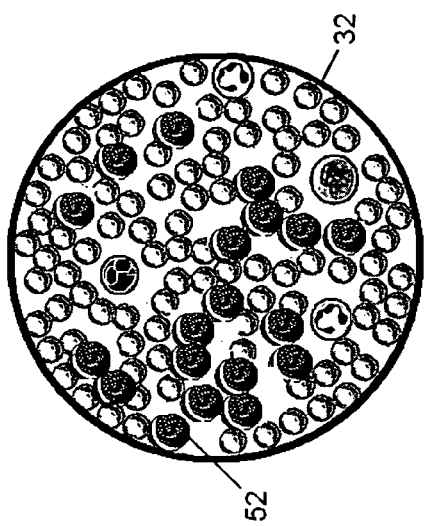
FIG. 8 is a plan view of a ninth embodiment of the kit of the present invention shown simulating the visual appearance of human blood afflicted with acute lymphocytic leukemia under a microscope.
Figure 10:
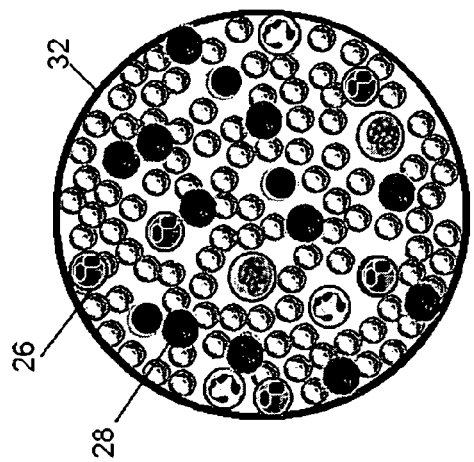
FIG. 10 is a plan view of an eleventh embodiment of the kit of the present invention shown simulating the visual appearance of human blood during an allergic reaction under a microscope.
Figure 7:
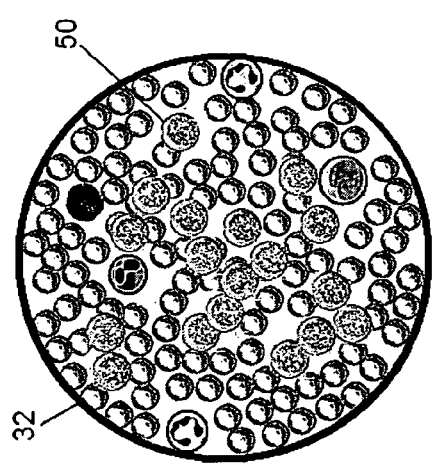
FIG. 7 is a plan view of an eighth embodiment of the kit of the present invention shown simulating the visual appearance of human blood afflicted with hairy cell leukemia under a microscope.
Figure 9:
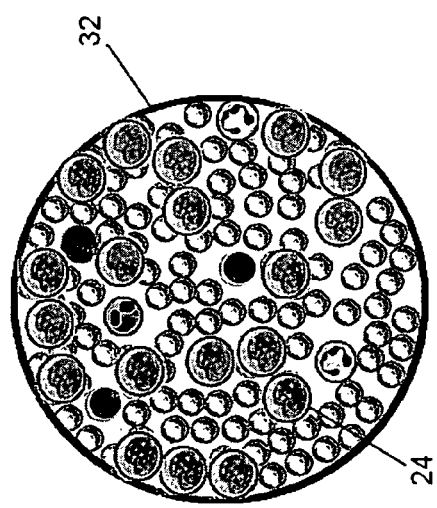
FIG. 9 is a plan view of a tenth embodiment of the kit of the present invention shown simulating the visual appearance of human blood afflicted with acute monocytic leukemia under a microscope.

By increasing the proportion of white blood cell replicas in the mixture of beads to an amount which would be statistically excessive, various models are produced that will familiarize a student with other blood pathologies. FIGS. 7-10 show the eighth, ninth, tenth, and eleventh embodiments of the present invention, respectively, demonstrating the various blood pathologies that can be demonstrated using the blood cell visual model. In FIG. 7, an increased number of lymphocyte replicas 50 are present in the container 32. Preferably, the additional lymphocyte replicas 50 are colored to have a cloudy surface to impart an overall cloudy appearance to the model to resemble the view under a microscope of blood afflicted with hairy cell leukemia. In FIG. 8, the hairy cell lymphocyte replicas 50 are replaced with immature lymphocyte replicas 52 having a dark shade of blue. The resulting visual model resembles the view under a microscope of blood afflicted with acute lymphocytic leukemia. In FIG. 9, an increased number of monocyte replicas 24 are present in the container 32 to resemble a blood smear exhibiting acute monocytic leukemia. Finally, in FIG. 10, the original mixture of beads is manipulated by increasing the number of basophil and eosinophil replicas 28, 26 to create a visual model to demonstrate how the level of these particular white blood cells increase due to an allergic reaction.

Various modifications can be made in the details of the various embodiments of the visual models of the present invention, all within the scope and spirit of the invention and defined by the appended claims.

The invention claimed is:

1. A kit for teaching the composition of blood and blood pathology, said kit comprising:
    a first set of beads replicating red blood cells, being round and transparent with a light red color;
    a second set of beads replicating white blood cells, being round and colored white and being of a larger diameter than said red blood cell beads; and
    small pieces of course material replicating platelets, said replicated platelets being of crushed sea shells.

2. The kit of claim 1, also including a flexible transparent tube having at least one open end having a removable stopper therefore, said tube being capable of holding a mixture of said red and white cell replica beads and said platelet replica material and having an inside diameter sufficiently large so that said mixture can flow within said tube.

3. The kit of claim 1, also including a round Petri dish, having a transparent removable cover, said Petri dish being capable of holding a mixture of said red and white cell replica beads and said platelet replica material to represent a blood sample as seen through a microscope.

4. The kit of claim 2, also including a third set of beads being oval-shaped transparent beads, being red in color to replicate red blood cells afflicted with sickle cell anemia, wherein the length of said oval-shaped beads is greater than the inside diameter of said transparent tube, and wherein some of said first set of beads replicating red blood cells are replaced by some of said third set of beads in said mixture within said tube.

5. The kit of claim 3, wherein the proportion of said first set of beads to said second set of beads in said mixture is increased to replicate blood afflicted with polycythemia.

6. The kit of claim 3, also including a test tube container for holding a mixture replicating said mixture in said Petri dish for demonstrating the pack cell volume of a blood sample.

7. The kit of claim 6, wherein the proportion of red blood volume replicated by said first set of red blood cell beads is about 46% by volume replicating what is normal for men.

8. The kit of claim 6, wherein the proportion of red blood volume replicated by said first set of red blood cell beads is about 38% by volume replicating what is normal for women.

9. The kit of claim 3, including a third set of beads being white beads being colored to have a cloudy surface, wherein a portion of said second set of white beads are replaced in said Petri dish with said cloudy surface fourth set of beads to replicate blood afflicted with hairy cell leukemia.

10. The kit of claim 8, including a third set of beads being white beads colored a dark shade of blue, wherein said fourth set of cloudy surface beads are replaced with said dark blue colored beads in said Petri dish to replicate blood afflicted with acute lymphocytic leukemia.

11. The kit of claim 3, including a third set of beads being white beads which are colored to replicate the look of monocyte white cells, wherein some of said second set of white cell beads are replaced with said sixth set of monocyte looking beads to represent blood afflicted with moncyte leukemia.

12. The kit of claim 3, including a third set of beads being white beads colored to replicate the look of basophil white cells, and an eighth set of white beads colored to replicate the look of eosinophil white cells, wherein some of said second set of white cell replica beads are replaced with said basophil white cell beads and with said eosinophil white cell beads to replicate blood afflicted with an allergic reaction.

13. A kit for replicating the look of normal blood and the look of blood with selected pathology, said kit comprising:
    a first set of round transparent beads colored light red replicating the look of normal red blood cells;
    a second set of round transparent white colored beads replicating the look of normal white blood cells, wherein said white colored beads are of a larger diameter than said red colored beads; and
    a round container for holding a mixture of said first and second set of beads for replicating the look of a blood sample under a microscope.

14. The kit of claim 13, wherein said round container is a Petri dish, and also including a flexible transparent tube having at least one open end having a stopper therefor for holding a mixture of said first and second set of beads.

15. The kit of claim 13, also including a third set of beads being white beads altered to replicate the look of neutrophil white blood cells.

16. The kit of claim 13, also including a third set of beads being white beads altered to replicate the look of lymphocyte white blood cells.

17. The kit of claim 13, also including a third set of beads being white beads altered to replicate the look of monocyte white blood cells.

18. The kit of claim 13, also including a third set of beads being white beads altered to replicate the look of eosinophil white blood cells.

19. The kit of claim 13, also including a third set of beads being white beads altered to replicate the look of basophil white blood cells.

20. The kit of claim 13, also including a third set of beads being oval-shaped red colored beads to replicate the look of red blood cells with sickle cell anemia.

21. The kit of claim 13, also including a quantity of small sized coarse material to replicate the look of blood platelets.

22. The kit of claim 21, wherein said coarse material is crushed sea shells, and also including a plurality of storage containers, each having a side through which the contents can be viewed, having an individual container for storing individually each of said sets of beads and said crushed sea shells.

23. A kit for teaching the composition of blood and blood pathology, said kit comprising: plural sets of beads including transparent round beads colored light red, transparent round beads colored white and being larger than said light red round beads, oval-shaped white beads, white beads colored in a range of from deep purple to blue, white beads painted with a multi-lobed nucleus on their surface, white beads painted with a bi-lobed nucleus on their surface, and white beads painted with a U-shaped nucleus on their surface.

* * * * *